Patented May 25, 1943

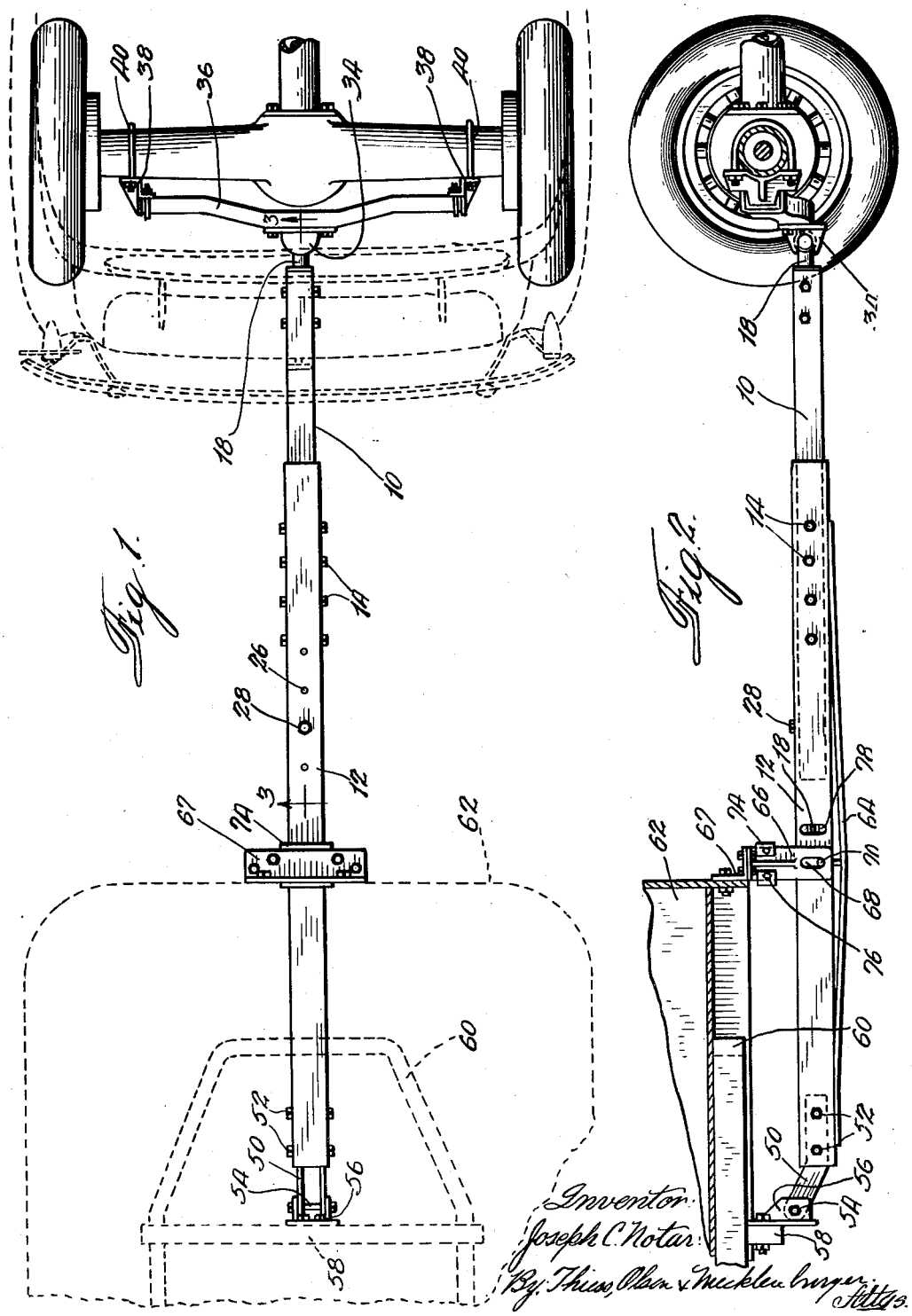

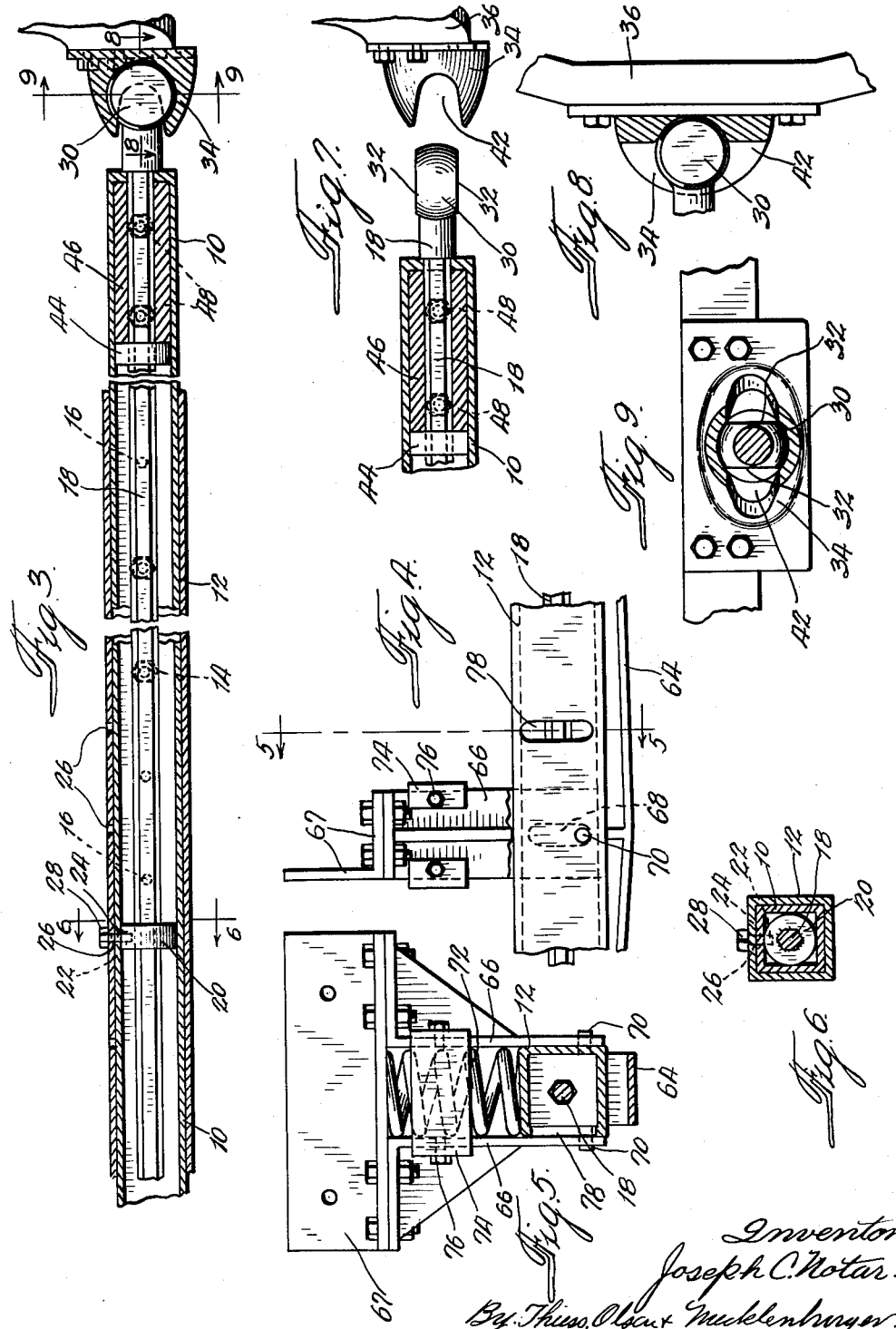

2,320,046

UNITED STATES PATENT OFFICE 2,320,046

TRAILER HITCH

Joseph C. Notar, Cedar Rapids, Iowa, assignor to Rapids Equipment Company, Inc., Cedar Rapids, Iowa, a corporation of Iowa Application March 5, 1941, Serial No. 381,792

5 Claims. (Cl. 280—33.44)

This invention relates to a trailer hitch for attaching a trailer to an automobile or other tow car.

While various trailer hitch constructions have heretofore been proposed, they are for the most part difficult to attach to trailers and tow cars and are incapable of ready adjustment as to length whereby a desired distance between the tow car and the trailer can be attained. A further disadvantage of many of such trailer hitches is that the connection of the trailer hitch to the tow car has been to the body thereof, thereby exerting an overload on the rear springs of the tow car.

Accordingly it is an object of this invention to provide a trailer hitch which may be secured directly to the undercarriage of a tow car in such a manner that the rear springs of the tow car are not overloaded.

A futher object of this invention is the provision of a trailer hitch which may be readily attached to a tow car adjacent its rear axle, but which is capable of becoming detached therefrom in case the tow car turns over.

A further object of this invention is the provision of a trailer hitch which is capable of being extended to a plurality of different lengths.

An additional object of this invention is the provision of a trailer hitch which is pivotally secured to the rear of the tow car in such a manner as to permit sharp turning of the tow car and trailer but which is firmly attached to the trailer to prevent swaying.

A further object of this invention is the provision of a trailer hitch having trailer-engaging means which resiliently cooperate between the hitch and the trailer to insure smooth riding of the trailer and to prevent transmission of road shocks through the hitch from the tow car to the trailer.

Further and additional objects will appear from the following description, the accompanying drawings, and the appended claims.

In carrying out this invention in one form, a trailer hitch is provided which comprises a drawbar having means at one end for pivotal engagement with the tow car, a shaft having means at one end for pivotal engagement with the trailer, means for securing the drawbar and the shaft together in adjustable end-to-end nonpivotal relationship, and second trailer-engaging means associated with the shaft and positioned remote from the first trailer-engaging means, the second trailer-engaging means being resiliently associated with the shaft whereby limited pivotal movement in a vertical plane of the shaft by the first trailer-engaging means is permitted when said shaft is mounted on a trailer. The trailer hitch is readily adjustable to any desired length and it is adapted to be attached and detached from the tow car with a minimum of effort. The combination of the two separate trailer-engaging means, one of which is pivotally mounted and the other of which is resiliently mounted, imparts easy riding qualities to the trailer due to the fact that the transmission of road shocks from the tow car to the trailer through the trailer hitch is minimized.

For a more complete understanding of this invention, reference should now be had to the drawings, in which Fig. 1 is a plan view of a trailer hitch constructed in accordance with one embodiment of this invention, the trailer hitch being shown as connecting a tow car and a trailer, portions of which are shown in dotted lines in order to afford a more complete view of the trailer hitch and means for mounting the same;

Fig. 2 is a side elevational view of the trailer hitch shown in Fig. 1, portions of the tow car and the trailer being in section;

Fig. 3 is a fragmentary sectional view of a portion of the trailer hitch taken along the line 3—3 of Fig. 1;

Fig. 4 is a fragmentary detail view of a portion of the trailer hitch shown in Fig. 1;

Fig. 5 is a sectional view taken along the line 5—5 of Fig. 4;

Fig. 6 is a cross-sectional view of a portion of the trailer hitch taken along the line 6—6 of Fig. 3;

Fig. 7 is a detail view partially in section of the tow car end of the drawbar of the trailer hitch and the engaging means therefor shown in detached relationship;

Fig. 8 is a detail view taken along the line 8—8 of Fig. 3, but showing the flattened head of the securing rod turned to a nonlocking position; and Fig. 9 is a sectional view taken along the line 9—9 of Fig. 3.

Referring now to the drawings and more particularly to Figs. 1 to 3, the invention is shown as embodied in a trailer hitch comprising a tubular drawbar 10 which is telescopically engaged with a tubular trailer shaft 12, the drawbar and the trailer shaft being locked in position by a plurality of bolts 14 threadably engaged with a plurality of registerable holes 16 (Fig. 3) in the drawbar 10 and the trailer shaft 12. The length of the trailer hitch may be adjusted by removing the bolts 14 from the holes 16 and extending the telescopically engaged tubular members to a desired length where certain other of the spaced holes 16 in the shaft and drawbar are brought into registering relationship. The bolts 14 are then reinserted through the registering holes to lock the shaft and drawbar together and provide a rigid trailer hitch having the desired length.

Associated with the drawbar 10 and rotatably mounted therein is a securing rod 18 extending for the entire length of the drawbar 10. This securing rod is preferably hexagonal in section to provide means for applying a wrench thereto for purposes of rotation. Adjacent the end of the securing rod 18 extending toward the trailer-engaging portion of the hitch (see Figs. 3 and 6) is welded a collar 20 which is capable of being rotated when the securing rod is rotated for the purposes hereinafter to be more fully described. The collar 20 is provided with an aperture 22 which is adapted to register, when the securing rod 18 is rotated to a predetermined position, with an aperture 24 in the drawbar 10 and with one of a plurality of apertures 26 in the trailer shaft 12 depending upon the length to which the hitch has been adjusted. A bolt 28 is provided which may be threaded through the apertures 26 and 24 and extend into the aperture 22 of the collar 20 to prevent the rod from being rotated. The apertures 26 on the upper surface of the trailer shaft 12 are spaced the same distance apart as the aperture 16 in the trailer shaft and the drawbar so that when the drawbar and shaft are locked in any predetermined extended position, one of the holes 26 will always register with the aperture 24 in the drawbar and the hole 22 of the collar 20.

The end of the securing rod 18 which extends from the free end of the drawbar 10 is provided with a spherical head portion 30 having flattened parallel side faces 32. As best shown in Figs. 3, 7, 8 and 9, this head portion is integral with the end of the securing rod 18. As shown in the drawings, the head portion 30 of the securing rod 18 is adapted to be fitted and locked into a cuplike member 34 permanently secured to the rear axle of a tow car (see Fig. 1) by means of a bar 36, bracket 38, and U bolts 40. The construction of this cup-shaped member 34 is clearly shown in Figs. 3, 7, 8 and 9. It comprises a socket for engaging the rounded surfaces of the spherical head 30 when the flattened parallel side faces of the spherical head are turned to a vertical position as indicated in Figs. 3 and 9. As shown, the cup member is provided with a transverse slot or opening 42 to permit the spherical head to be disengaged from the socket when the head is rotated to the position shown in Fig. 7 wherein the flat faces of the head are horizontal. It will thus be clear that the trailer hitch is provided with means for pivotally securing the end of the securing rod 18 to the tow car and that a disconnection of the trailer hitch may be effected by rotating 90° either the securing rod 18 or the cuplike member itself. The rotation of the cup-shaped member in the construction shown may occur if the tow car overturns, and consequently the trailer is automatically disconnected from the tow car and will not be overturned thereby.

In order firmly to hold the securing rod 18 within the drawbar 10 to prevent lateral separation thereof, a second collar 44 is welded or otherwise secured to the securing rod near the head 30 but positioned inside of the tubular drawbar 10 (see Figs. 3 and 7). This collar abuts against an annular member 46, fitted into the end of the drawbar 10 and secured firmly therein by means of suitable bolts 48, to prevent the securing rod 18 from being pulled out of the drawbar 10. The collar 44 is circular in shape to permit the securing rod to be rotated within the drawbar 10.

The trailer-engaging end of the trailer shaft 12 is provided with a pair of brackets 50 secured thereto by bolts 52. These brackets are adapted to be pivotally engaged with a bolt 54, which extends through apertures in a pair of outwardly extending flanges 56 secured to a cross bar 58 which latter is associated with a frame portion 60 of the trailer 62. By this construction the trailer shaft 12 is secured to the trailer 62 in such a manner as to provide pivotal movement thereof in a vertical plane with respect to said trailer.

The trailer shaft 12 is also provided with a supporting truss 64 on the under side thereof.

Associated with the trailer shaft 12 and positioned about midway between the ends thereof is a second trailer-engaging means. This second trailer-engaging means comprises a pair of brackets having downwardly extending side members 66 which are fixedly secured to the lower portion of the trailer 62 by means of an L-shaped member 67. The downwardly extending members 66 embrace the tubular trailer shaft 12 and are each provided with an elongated vertically extending slot 68. A pair of oppositely extending pins or dogs 70 are provided on the trailer shaft which extend through the elongated slots 68 of the downwardly extending members 66. The dogs 70 are adapted to abut against the lower ends of the slots 68 in the members 66 to limit the pivotal movement about the bolt 54 of the trailer shaft in a downward direction, thereby preventing the hitch from dropping to the ground when it is disconnected from the tow car. Likewise the upper ends of the elongated slots 68 in cooperation with the dogs 70 limit the upward pivotal movement of the trailer shaft 12 about the pivot bolt 54. As shown in Fig. 5, a compressed coil spring 72 is positioned between the downwardly extending members 66 in such a manner that one end abuts against the upper surface of the trailer shaft and the other end abuts against the horizontal portion of the trailer-engaging L-shaped bar 67. The coil spring 72 is retained between the downwardly extending members 66 by means of braces 74 secured to the members 66 by means of the bolts 76. Thus the trailer shaft 12 is capable of limited vertical pivotal movement about the pivot 54 adjacent its end, this pivotal movement being restricted by the action of the coil spring 72 which serves as a buffer between the body of the trailer and the trailer hitch. Transmission of road shocks from the tow car to the trailer through the trailer hitch is thus eliminated, and smoother riding of the trailer is provided. The dogs 70 which extend through the elongated slots 68 of the downwardly extending members 66, in addition to holding the trailer shaft in place, provide a snubbing means for the coil spring 72 whereby it is prevented from being compressed or extended greater than a predetermined amount when the tow car and trailer are being driven over rough roads.

The main body portion of the trailer shaft 12 is provided with an elongated slot 78 immediately forward of the second trailer-engaging means on the shaft. This elongated slot 78 provides an opening for inserting a wrench for rotating the securing rod 18 extending through the drawbar 10 as hereinbefore described. This slot 78 should be positioned so that a portion of the securing rod 18 will always be adjacent thereto irrespective of the adjustment of the position of the drawbar with respect to the trailer shaft. This is accomplished by providing a securing rod which extends a substantial distance beyond the inside end of the drawbar 10.

The improved trailer hitch embodying this invention permits a resilient connection between the tow car and trailer, is readily adjustable as to length, and may be readily attached and detached from a tow car. In order to detach the trailer hitch from the tow car, the locking bolt 28 is removed from the upper portion of the trailer shaft, thereby permitting the securing rod 18 to be rotated by means of a wrench or other means which is insertable through the slot 78. A 90° rotation of the securing rod brings the parallel faces 32 of the flattened head 30 at the end of the rod to a substantially horizontal position and the cup member 34 and the head 30 of the securing rod 18 may be readily separated. The reverse operation is carried out when it is desired to connect the trailer hitch to the tow car.

While a particular embodiment of this invention has been shown and described, it will be understood, of course, that the invention is not to be limited thereto, since many modifications may be made, and it is contemplated, therefore, by the appended claims, to cover any such modifications as fall within the true spirit and scope of this invention.

I claim:

1. A trailer hitch comprising a tubular drawbar, a tubular shaft having means at one end for engaging a trailer, said tubular shaft and said drawbar being telescopically engaged with each other, means for locking said drawbar and said tubular shaft together in any one of a plurality of predetermined extended positions, a securing rod extending axially through said drawbar from the free end thereof and into said tubular shaft for axial rotation therewithin, cooperating means associated with the free end of said rod adjacent the free end of said drawbar for pivotally engaging said rod with a tow car when said means is in one position and to release said rod from said tow car when said means is rotated to another position, and means for preventing lateral separation of said tubular shaft, said drawbar and said cooperating means, said tubular shaft having a side opening providing access to said rod for rotating the same.

2. A trailer hitch comprising a tubular drawbar, a tubular shaft having means at one end for engaging a trailer, said tubular shaft and said drawbar being telescopically engaged with each other in end-to-end nonpivotal relationship, means for locking said drawbar and said tubular shaft together in any one of a plurality of predetermined extended positions, a securing rod extending axially through said drawbar from the free end thereof and into said tubular shaft for axial rotation therewithin, a spherical head having flattened parallel side faces on the free end of said rod adjacent the free end of said drawbar, means for pivotally engaging said head to secure said rod to a tow car when said head is in one position and to release said rod from said tow car when said head is rotated to another position, and means associated with said tubular shaft for locking said rod in said one position, said tubular shaft having a side opening providing access to said rod for rotating the same.

3. In combination with a trailer and a tow car, a trailer hitch pivotally secured directly to the undercarriage of said tow car thereby preventing overloading of the rear springs thereof, said trailer hitch comprising a drawbar removably secured at one end to said undercarriage as aforesaid, a shaft pivotally engaged at one end with said trailer at one point, and means securing said drawbar and said shaft together in end-to-end nonpivotal relationship in any one of a plurality of adjustable positions, said shaft also being yieldably engaged with said trailer at another point whereby limited pivotal movement in a vertical plane of said shaft about said one point is permitted.

4. In combination with a trailer and a tow car, a trailer hitch pivotally secured directly to the undercarriage of said tow car thereby preventing overloading of the rear springs thereof, said trailer hitch comprising a tubular drawbar removably secured at one end to said undercarriage as aforesaid, a tubular shaft in telescopic engagement with said drawbar and engaged at one end with said trailer at one point, means locking said drawbar and said shaft together in a desired predetermined extended nonpivotal relationship, and means on said shaft removed from said one end thereof yieldably engaging said trailer at another point, said last mentioned means including a coiled spring cooperating with said shaft whereby limited pivotal movement in a vertical plane of said shaft about said one point is permitted.

5. The combination recited in claim 4 wherein said tubular drawbar includes an elongated rotatable undercarriage securing means extending through the tubular portion of said drawbar and into said tubular shaft, said tubular shaft being provided with an opening remote from said undercarriage and said trailer through which ready access may be had for rotating said securing means to normal undercarriage engaging and disengaging positions.

JOSEPH C. NOTAR.